(12) United States Patent
Xiong et al.

(10) Patent No.: US 8,208,477 B1
(45) Date of Patent: Jun. 26, 2012

(54) DATA-DEPENDENT OVERLAY NETWORK

(75) Inventors: Yuhong Xiong, Mountain View, CA (US); Robert N. Mayo, Mountain View, CA (US); James A. Rowson, Fremont, CA (US); Eamonn O'Brien-Strain, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1615 days.

(21) Appl. No.: 11/210,443

(22) Filed: Aug. 24, 2005

(51) Int. Cl.
*H04L 12/28* (2006.01)
(52) U.S. Cl. ........................ 370/400; 713/150
(58) Field of Classification Search ............. 370/469, 370/464, 400, 389; 713/150
See application file for complete search history.

(56) References Cited

U.S. PATENT DOCUMENTS

| | | | |
|---|---|---|---|
| 5,987,506 A * | 11/1999 | Carter et al. | 709/213 |
| 7,165,116 B2 * | 1/2007 | Grove et al. | 709/245 |
| 7,373,394 B1 * | 5/2008 | Li et al. | 709/219 |
| 2004/0054807 A1 * | 3/2004 | Harvey et al. | 709/243 |
| 2005/0149531 A1 * | 7/2005 | Srivastava | 707/10 |
| 2006/0190715 A1 * | 8/2006 | Miller | 713/150 |
| 2006/0195356 A1 * | 8/2006 | Nerenhausen et al. | 705/14 |
| 2008/0043634 A1 * | 2/2008 | Wang et al. | 370/252 |

OTHER PUBLICATIONS

Demers, A. et al., "The Bayou Architecture: Support for Data Sharing Among Mobile Users", Xerox Palo Alto Research Center, CA, Sep. 1996.
Paluska, J. M. et al., "Footloose: A Case for Physical Eventual Consistency and Selective Conflict Resolution", 2003.
Stoica, I. et al., "Chord: A Scalable Peer-to-Peer Lookup Service for Internet Applications", SIGCOMM '01, Aug. 2001, San Diego, CA.
Zhao, B. et al., "Tapestry: An Infrastructure for Fault-Tolerant Wide-Area Location and Routing", Univ. California, Berkeley, Apr. 2001.

* cited by examiner

*Primary Examiner* — Chi Pham
*Assistant Examiner* — Wei Zhao

(57) ABSTRACT

A data-dependent overlay network includes a plurality of data clouds. Each data cloud includes related data stored in a plurality of nodes in the data cloud. A peer list is maintained by each node in the data cloud. A peer list update process is used by each node in the data cloud for adding or removing nodes from peer lists for nodes in the data cloud.

28 Claims, 5 Drawing Sheets

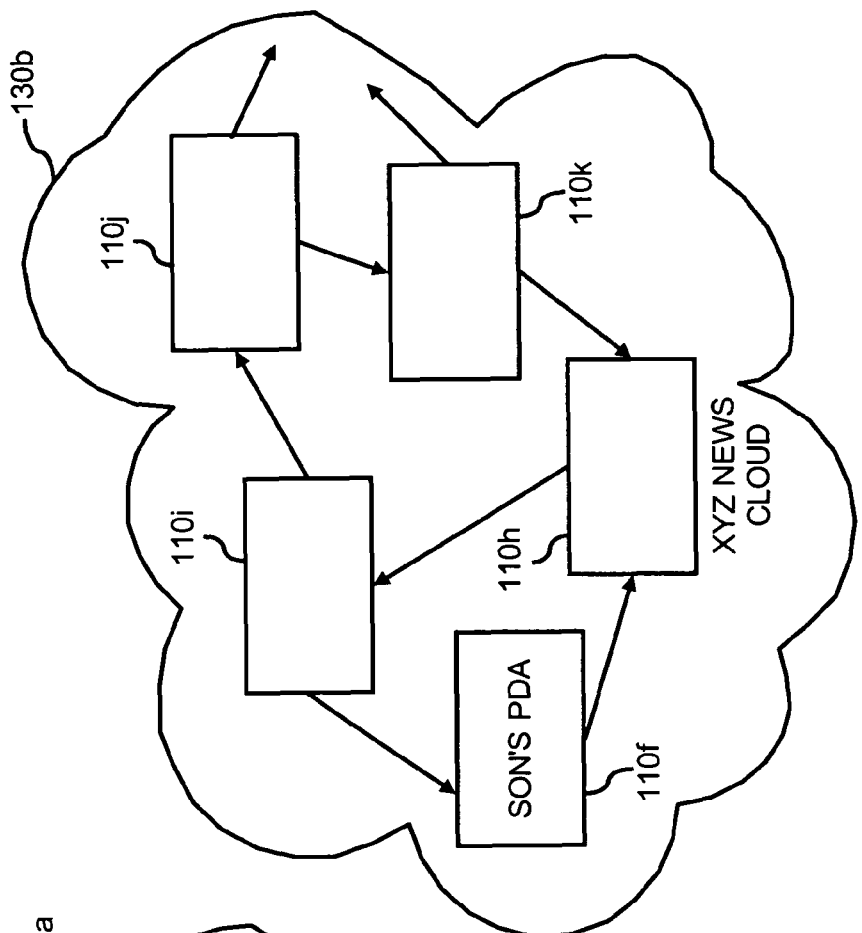
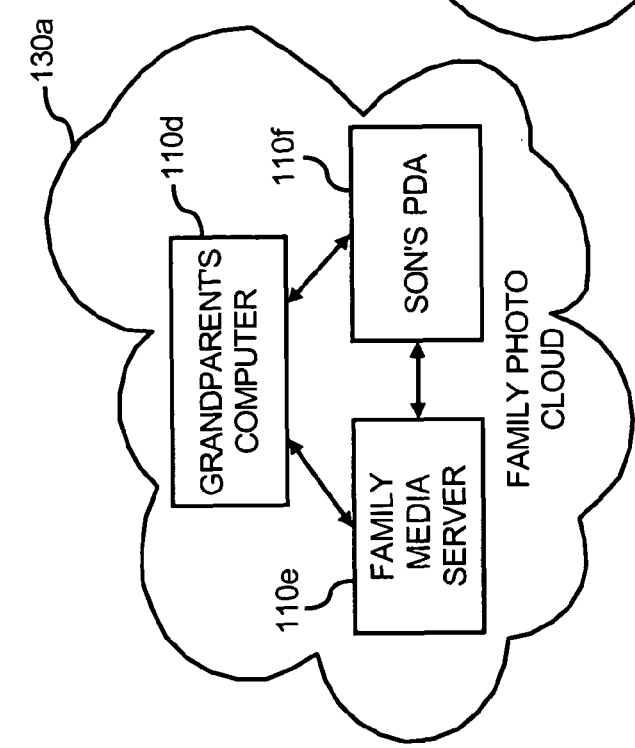
FIG. 2B
FIG. 2A

DATA-DEPENDENT OVERLAY NETWORK

BACKGROUND

Recently, distributed hash table (DHT) overlay networks have been used to solve the problem of data placement and retrieval in large scale, Internet-sized storage systems. These systems generally include distributed network systems implemented, for example, using peer-to-peer (P2P) networks for storing vast amounts of data. The overlay networks are logical representations built on top of the underlying physical networks, which provide, among other types of functionality, data placement, information retrieval, routing, etc. Some examples of DHT overlay networks include content-addressable-network (CAN), PASTRY, and CHORD.

DHT overlay networks attempt to guarantee the location of a data item and through use of a hash table provide a means for retrieving data from their guaranteed locations. DHT overlay networks, although having good data storage and retrieval qualities, generally do not handle partitioning well. For example, if a DHT network is partitioned into two halves, a node may not know that the data it is interested in is actually available in another node in the same half, because the DHT routing algorithm requires the first node to go through a node in the other half before locating the node storing the data. This may result in increased network traffic and latencies.

SUMMARY

A data-dependent overlay network includes a plurality of data clouds. Each data cloud includes related data stored in a plurality of nodes in the data cloud. A peer list is maintained by each node in the data cloud. A peer list update process is used by each node in the data cloud for adding or removing nodes from peer lists for nodes in the data cloud.

BRIEF DESCRIPTION OF THE DRAWINGS

The utility, objects, features and advantages of the invention will be readily appreciated and understood from consideration of the following detailed description of the embodiments of this invention, when taken with the accompanying drawings, in which same numbered elements are identical and:

FIGS. 2A-B illustrate examples of data clouds, according to an embodiment;

DETAILED DESCRIPTION

For simplicity and illustrative purposes, the principles of the embodiments are described. However, one of ordinary skill in the art would readily recognize that the same principles are equally applicable to, and can be implemented in variations that do not depart from the true spirit and scope of the embodiments. Moreover, in the following detailed description, references are made to the accompanying figures, which illustrate specific embodiments. Electrical, mechanical, logical and structural changes may be made to the embodiments without departing from the spirit and scope of the embodiments.

Figure 1:
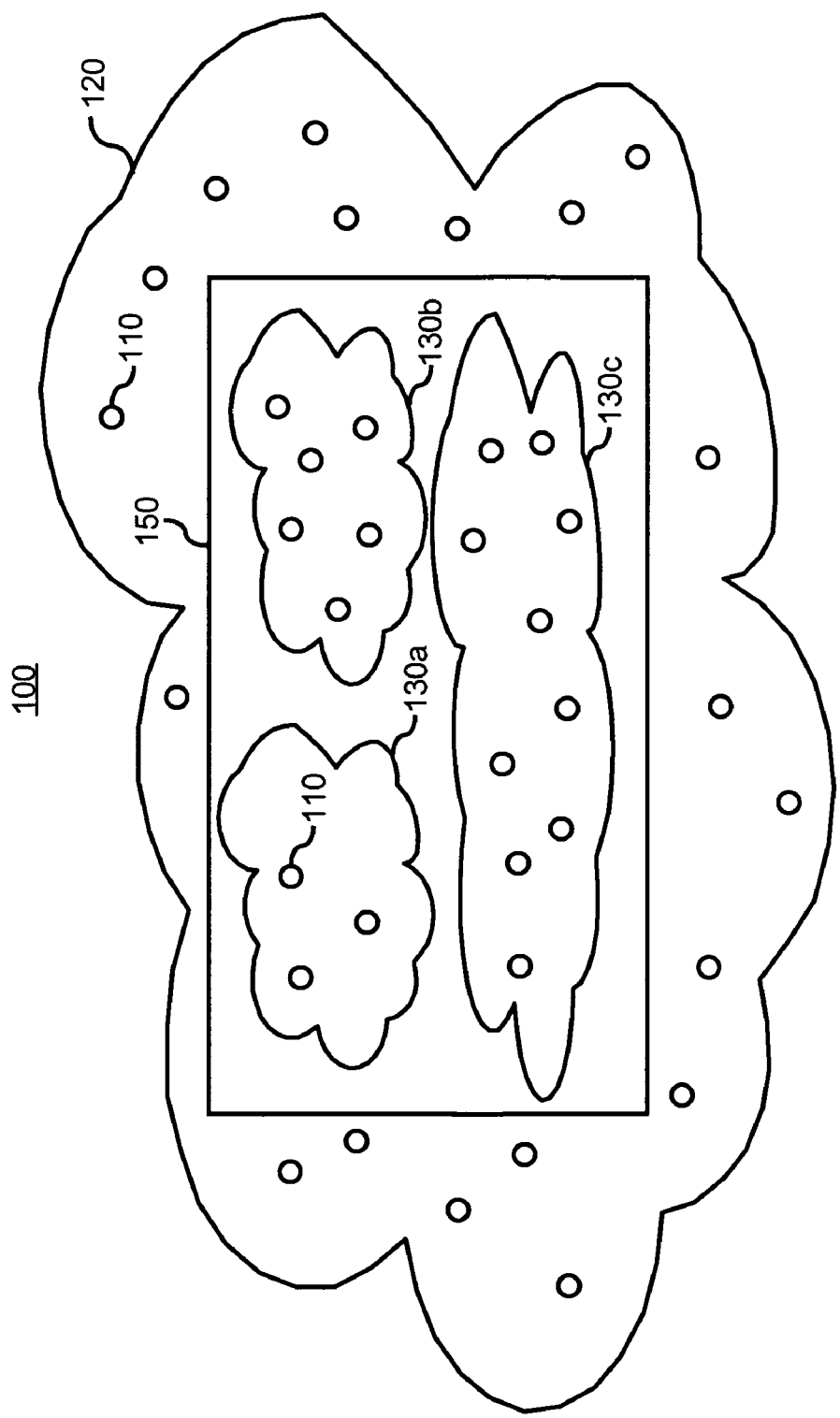
FIG. 1 illustrates a system, according to an embodiment.

FIG. 1 illustrates a system 100, according to an embodiment. The system 100 includes nodes 110. A node of the nodes 110 is an electronic device. In one example, a node may include an end-user device, such as a personal computer, personal digital assistant (PDA), cellular phone, digital camera, digital watch, and other types of end-user devices. In other examples, a node may include a server or other types of electronic device that are typically not used as an end-user device. The nodes 110 are connected via a network 120, which may include one or more networks, such as one or more of local area networks, wide-area networks, public networks, private networks, wired networks, wireless networks, storage area networks, and the like.

In one embodiment, the system 100 is a peer-to-peer network, referred to as the P2P network 100, whereby the nodes 110 are peers in the peer-to-peer network 100. At least some of the nodes 110 may be transient nodes that may leave or join the P2P network 100 at any time. The nodes 110 store and share data as peers in the P2P network 100.

1. Data-Dependent Topology of Overlay Network

According to an embodiment, the system 100 includes a data-dependent overlay network 150. The overlay network 150 is a logical representation built on top of an underlying physical network, such as a plurality of the nodes 110 connected via the network 120. The underlying physical network may include a P2P network, and the overlay network 150 may include a P2P overlay network. The overlay network 150 provides, among other types of functionality, data placement, information retrieval, possibly routing, and other types of functionality described in further detail below. The nodes in the overlay network 150 include hardware and software for performing the functionality of the data-dependent overlay.

The overlay network 150 is data-dependent, because a data space comprised of data stored in the nodes in the overlay network 150 is organized based on how data in the data space is related. According to an embodiment, the data space is partitioned into subsets of data, referred to as data clouds. As shown in FIG. 1, the overlay network 150 includes data clouds 130a-c. The data clouds 130a-c are subsets of the data space. In one embodiment, the data clouds 130a-c are non-overlapping subsets of the data space. In the embodiment with non-overlapping data clouds, the subset of the data space represented by each data cloud may be non-overlapping. However, a node may be a member of more than one non-overlapping data cloud. In another embodiment, some of the data clouds may overlap. For example, data clouds may be provided for a conference. Two of the data clouds may include data for related topics covered in the conference. A set of reference documents may be relevant to both data clouds because the topics are related and may be stored in nodes in both of the data clouds. The reference documents, for example, are the overlap between the data clouds.

The number of data clouds 130a-c is shown by way of example. The overlay network 150 may include as few as one data cloud or more than three data clouds, and possibly hundreds or thousands of data clouds, such as may be provided with a large P2P network which may include nodes in the Internet.

The data clouds are data dependent such that the data in a data cloud is related. For example, the data may be related by topic, such as photographs for a family, or the data may be related by data source, such as news from a media company. The data may be related by application. For example, data in the data cloud is used by an application, such as a photo-sharing application. Other types of data relationships may also be used to define the type of data in a data cloud.

Thus, the topology of the overlay network 150 and sub-overlay networks in the overlay network 150 are data dependent, because the clouds comprise subsets of related data from the data space. This provides several benefits including application adaptability. Different data clouds may have different topologies depending on the application requirements.

When the underlying network is partitioned, the overlay network 150 allows the nodes 110 to continue to communicate with the other nodes in the same partition. Also, the clustering of data and nodes by data cloud makes some applications more resistant to network partition. For example, if a family is on vacation, the devices of all the family members may be disconnected from the Internet, but they as a group can continue to communicate with each other and run the family photo sharing application. The topology is highly scalable. Each node may only need to keep a small set of nodes on its peer list, but the whole network can be very large.

A sub-overlay network, for example, includes the nodes in a data cloud. Each node in a data cloud maintains a peer list of other nodes interested in the data cloud, which is described in further detail below. A node in a data cloud may include a node storing data in the data cloud or may include a node interested in data in a data cloud. For example, a data cloud may include digital photographs for a family. A family member's node might not store any of the digital photographs, for example, due to storage limitations of the node, but is interested in viewing the photographs. The node used by that family member is in the data cloud. Also, a node storing any of the photographs may also be a node in the data cloud.

FIGS. 2A and 2B illustrate examples of the data clouds 130a and 130b shown in FIG. 1. The data cloud 130a shown in FIG. 2A, for example, is a family photo data cloud including digital photographs for a family. The family photo data cloud 130a, for example, includes three nodes 110d-f. In one example, the node 110d includes a personal computer at the grandparent's house. The node 110e is a family media server at the father's house, and the node 110f is a PDA used by the son.

FIG. 2B illustrates an example of the data cloud 130b. For example, the data cloud 130b is the XYZ news cloud including data provided by the XYZ news source. The XYZ news cloud 130b includes, for example, nodes 110h-k and the node 110f, which belongs to both the data clouds 130a and 130b. In one example, the XYZ news data cloud 130b includes nodes retransmitting news from the XYZ news source to other nodes interested in the news provided by the XYZ news source.

A node may be a member of multiple data clouds. This is illustrated in FIGS. 2A and 2B. For example, the node 110f, which is the son's PDA, may be a member of both data clouds 130a and 130b. For example, the son may be interested in news from the XYZ news source and is also interested in viewing the family photos. Thus, the node 110f is in both data clouds 130a and 130b.

2. Peer Lists

According to an embodiment, the topology of the overlay network 150 is dynamic and peer lists may be used to form and modify topologies of sub-overlay networks, such as the topologies of each of the data clouds 130a-c.

According to an embodiment, peer lists are used by nodes to maintain an interest in data clouds. Maintaining an interest includes, for example, being a member of a data cloud, retrieving and storing data from nodes in a data cloud, searching for data in a data cloud, etc. In one embodiment, each node in a data cloud maintains a peer list of a set of nodes that are also interested in the same data cloud. A peer list for a node includes at least one other node in the data cloud. In one embodiment, different nodes in the data cloud may have different peer lists for the same data cloud. In another embodiment, all the nodes in the data cloud have the same peer list. Also, a node maintains a peer list for each data cloud the node is interested in. For example, the node 110f shown in FIGS. 2A and 2B maintains a peer list for data clouds 130a and 130b. Because the peer list is dynamic, each node can periodically add new nodes that it gets to know, or remove nodes that have left the network. Also, the cost of adding or removing a node to the network is low since each node already performs peer list update regularly.

The peer list includes one or more other nodes in the data cloud. The data cloud 130a is small with only three nodes as shown in FIG. 2A. The peer list in each of the nodes 110d-f for the data cloud 130a may include all the other nodes in the data cloud. This is illustrated through the arrows shown in FIG. 2A connecting the nodes 110d-f. For example, each line with arrow means that the destination node is on the peer list of the source node. Each line with arrows on both ends means that the two devices connected by the line are on the peer list of each other. In FIG. 2A, each of the nodes includes the other nodes on their peer list for the data cloud 130a. The data cloud 130b shown in FIG. 2B is larger than the data cloud 130a shown in FIG. 2A and the peer list for nodes in the data cloud 130b may not include all the nodes in the data cloud 130b. For example, the peer list for the data cloud 130b for the node 110h includes the node 110i, and the peer list for the data cloud 130b for the node 110f includes the node 110h.

Figure 3:
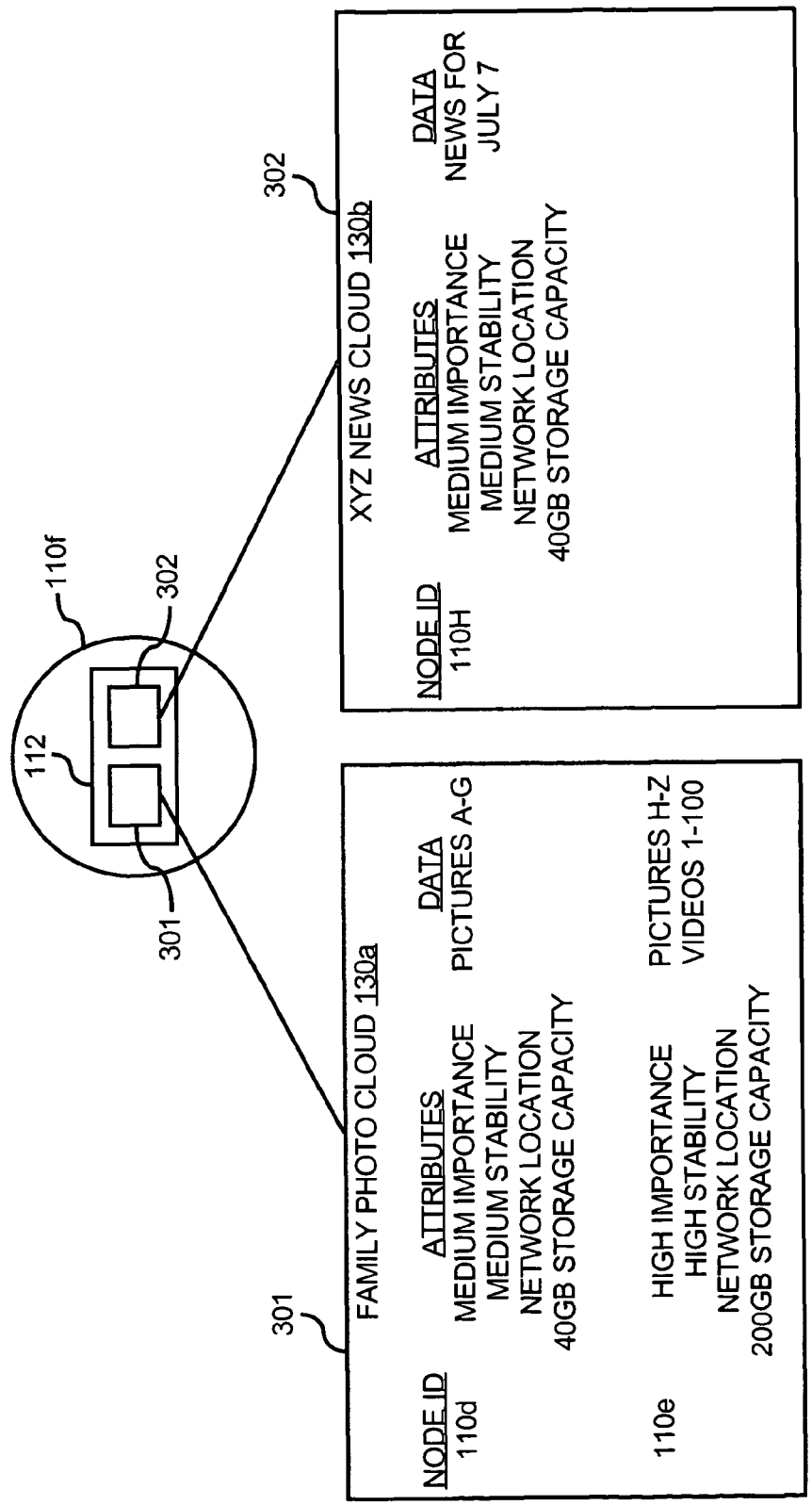
FIG. 3 illustrates examples of peer lists, according to an embodiment.

The node 110f, which for example is the son's PDA, is a member of both the data clouds 130a and 130b. FIG. 3 illustrates examples of peer lists 301 and 302 maintained by the node 110f for the data clouds 130a and 130b respectively. The peer lists 301 and 302 are stored in the storage device 112. Maintaining a peer list includes, for example, storing a peer list and updating the peer list to add or remove data from the peer list. For example, nodes may be added or removed from a peer list as they leave or join the data cloud. Maintaining may also include subscribing to updates from other members of the data cloud.

An example of the types of data in a peer list include unique node IDs, node attributes, and data stored in the node. The peer list 301 shown in FIG. 3 is for the data cloud 130a for the node 110f. The peer list 301 includes the node IDs for the nodes 110d and 110e based on the example shown in FIG. 2A, attributes for the nodes 110d and 110e and the data stored in each of the nodes 110d and 110e. Examples of attributes may include stability of a node, amount of data stored in the node, the storage capacity of the node, the network location of the node, and others. Stability may include uptime of a node, how long the node stays connected to the network so other nodes can communicate with the node, and other similar metrics. Stability may be determined and represented in terms of categories, such as excellent, good, average, and poor. Also, the attributes may include an importance of a node in the data cloud. For example, node 110e comprised of the family media server may be represented as "high importance", but a node comprised of a digital camera may be represented as "low importance" because the digital camera may be highly transient, such that it is typically not connected to the network and not in communication with other nodes in the data cloud, and the digital camera may not store many pictures. The node IDs may include a unique ID such as an IP address or other type of ID. The data stored in the node may include a description of the data stored in the node or other type of identification of the data stored in the node. The descriptions may be searchable so another node in the data cloud can identify nodes including data the node is interested in.

The node IDs, attributes for the nodes, and the data stored in each of the nodes are examples of the types of data in a peer list. Other types of data may also be stored in a peer list. Also, peer lists for different clouds may have different types of data.

The peer list 302 for the data cloud 130b includes the node ID for the node 110h based on the example shown in FIG. 2B. The node ID may include a unique ID for the node 110h that allows a node to address or otherwise communicate with another node. The attributes and description of data stored in the node 110h for the data cloud 130b is also in the peer list 302.

As shown in FIGS. 2A-B and 3, the peer lists on different nodes may be different. Also, through logical connections established by peer lists stored in nodes in a data cloud, all or many of the nodes in a data cloud may be logically connected. The logical connections are shown with arrows between nodes in FIGS. 2A and 2B. Also, all the nodes in a data cloud may not be physically connected, such as being able to communicate with each other all the time. However, even if a node is not connected to the data cloud, the data may be retrieved from that node when it becomes connected to the data cloud. For example, a node can receive and store data from currently connected nodes, and forward it to the nodes that are not currently connected later, such as when those nodes get reconnected. For example, referring to FIG. 2A, the PDA including the node 110f may be in the father's house and connected to the family media server node 110e via a wireless LAN but may not be connected to the node 110d at the grandparent's house. At that time, the PDA 110f may receive pictures stored in the family media server node 110e and may exchange peer lists with the family media server node 110e. However, the PDA 110f may receive photos and exchange peer lists with the node 110d at a later time when it is connected to the node 110d.

The peer lists allow for the dynamic modification of topologies of sub-overlay networks comprised of the nodes in each of the data clouds in the overlay network 150 shown in FIG. 1. The topologies may be adaptable for application requirements. For example, the family photo data cloud 130a shown in FIG. 2A may be fully connected because the number of nodes in the data cloud 130a is small and the communication between the nodes is bi-directional. The topology for the XYZ News data cloud 130b shown in FIG. 2B may be similar to a distribution tree, as the number of devices is large and the communication is mostly unidirectional between the nodes in the data cloud 130b, especially if many of the nodes are re-broadcasting data from the XYZ News source. The topologies may be dynamic through use of peer lists. For example, as nodes join and leave data clouds the topologies of the data clouds change. Notification of nodes joining and leaving a data cloud may be performed through peer list updates as described in detail below.

3. Peer List Update Processes

According to an embodiment, one or more peer list update processes may be used by nodes 110 in data clouds to update peer lists for respective data clouds. In one embodiment, different peer list update processes may be used for different data clouds, so the overlay topology for different clouds can be different.

A peer list update process, which is a method, is executed by each node interested in a data cloud. A peer list update process is operable to add new nodes to a peer list and remove nodes from a peer list. Part of an update process may include exchanging peer lists with other nodes in the data cloud. A node can get to know a new node in a data cloud, for example, when the new node contacts it, or when it receives a peer list for the data cloud including the new node. Also, a node may be removed from a peer list if the node maintaining the peer list receives notification of the node leaving the data cloud or receives a peer list indicating that the node has left the data cloud or if a node fails to reply to one or more messages. Other techniques may be used for determining whether to remove a node from a peer list. Also, importance of a node in a data cloud may affect the decision threshold on when to remove a node from a peer list. For example, a node having an attribute of "high importance" may never be removed or removed if a response from that node has not been received after a long period of time or if the node fails to respond to a large number of messages over a long period of time. A node of "low importance" may be removed if the node fails to respond within a short period of time or fails to respond to small number of messages.

One embodiment of an update process includes adding all nodes to the peer list when a communication is received that indicates that a node is in the same data cloud. For example, referring to FIG. 2A, assume the node 110d is joining the data cloud 130a. The node 110d, for example, sends a message to a node that is in the data cloud 130a, such as the node 110e. The node 110e sends a message to the node 110f indicating that the node 110d is in the data cloud 130a. The node 110f updates its peer list to include the node 110d. Also, the node 110d receives the peer list of the node 110e and stores it. Removal of a node from a peer list can also be done using a timeout mechanism, such as failure to respond to one or more messages within a predetermined period of time or using another removal procedure. Also, in this embodiment, all the nodes in the data cloud attempt to maintain the same peer list.

The embodiment of adding all nodes to a peer list may be performed when a minimal number of nodes are in a data cloud. However, when a data cloud is large and includes a large number of nodes or based on other conditions, such as application requirements, other update processes may be used. For example, in one embodiment, each node in a data cloud maintains a random subset of all known peers in its respective peer list. For example, a node randomly determines a set of nodes to keep on its peer list. This embodiment may be beneficial for balancing network traffic in a data cloud where data is continually being distributed, such as in the XYZ News data cloud 130b shown in FIG. 2B where news from the XYZ news source is distributed to nodes in the data cloud.

In another embodiment of an update process, a node maintains the closest nodes on its peer list or a random set of the closest nodes. Closeness in the network may be determined based on a metric, such as latency or number of hops.

In another embodiment of an update process, a node maintains a random set of nodes that include certain types of nodes. For example, the node keeps 5 randomly selected nodes, 5 nodes of "low importance", 5 nodes of "medium importance", and 5 nodes of "high importance", and 5 closest nodes on its peer list.

One or more of these embodiments may be combined. For example, as described above, a random set of nodes that include certain types of nodes may include randomly selecting nodes or selecting a set of closest nodes. Also, in any of these embodiments, nodes having a "high importance" or "high stability" may be maintained on the peer list.

4. Searching and Storing Data

A node in a data cloud may search for data of interest in the data cloud. For example, referring to FIG. 2A, the node 110d is searching for pictures of grandchildren. The node 110d searches the description of data stored in the nodes on its peer list. If the node 110d identifies a node storing the data of interest, such as pictures of the grandchildren, then the node sends a request for the data of interest to the node storing the data of interest. If the node 110d cannot find the data of interest on its peer list, the node 110d may send a query to other nodes in the data cloud including a request for the data of interest. A node receiving the query may determine whether its peer list includes the data of interest and/or forwards the query to one or more other nodes in the data cloud. The query may be forwarded to a maximum predetermined number of nodes. Also, a node may respond to the query if it is storing the data of interest or if it knows of a node storing the data of interest.

Nodes decide which data in the data cloud to store. More than one node in the data cloud may store the same data. In one embodiment, a node stores all the data in the data cloud. This may be feasible if the node has sufficient storage capacity to store all the data in the data cloud. In another embodiment, a node stores all the data of interest. The data of interest may include any data in the data cloud that is of interest to, for example, a user of the node. In another embodiment, a node stores all the data it needs or uses and then may delete that data after it is used. For example, the node 11f shown in FIG. 2A stores some recent vacation pictures. After the data has been transferred to the node 110e, the data is deleted from the node 110f because the node 110f has limited storage capacity. Other storage and caching techniques may be used as is known in the art.

Figure 4:
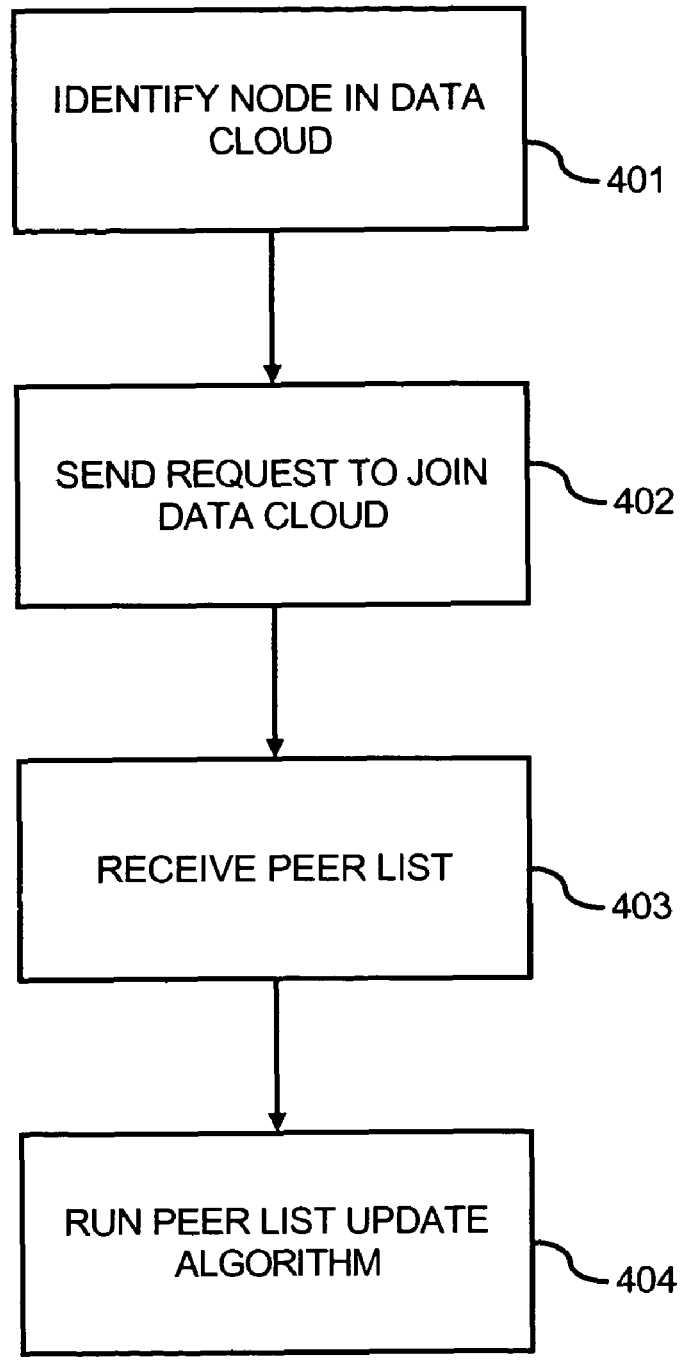
FIG. 4 is a flowchart of a method, according to an embodiment.

FIG. 4 illustrates a method 400, according to an embodiment. The method 400 is described with respect to FIGS. 1-3 by way of example and not limitation. At step 401, a node identifies another node that is in a data cloud that includes data of interest to the node. For example, referring to FIG. 2A, the node 110d wants to view family pictures. The grandparents, using the node 110d, are informed of the IP address of the node 110e, for example, by the owner of the node 110e, and the node 110d sends a request to join the data cloud 130a at step 402. At step 403, the node 110d receives the peer list of the node 110e in response to the request. At step 404, the node 110d runs a peer list update process for the data cloud 130a to maintain its peer list. The node 110d may receive the peer list update process, as software, from the node 110e. At step 401, in another example, a node may identify other data clouds that may include data of interest by receiving peer lists for other data clouds. For example, the node 110d may request the node 110f to send all of its peer lists, which includes the peer list 302 shown in FIG. 3 for the data cloud 130b. If the data cloud 130b includes data of interest to the node 110d, the node 110d contacts the node 110f to join the data cloud 130b.

Figure 5:
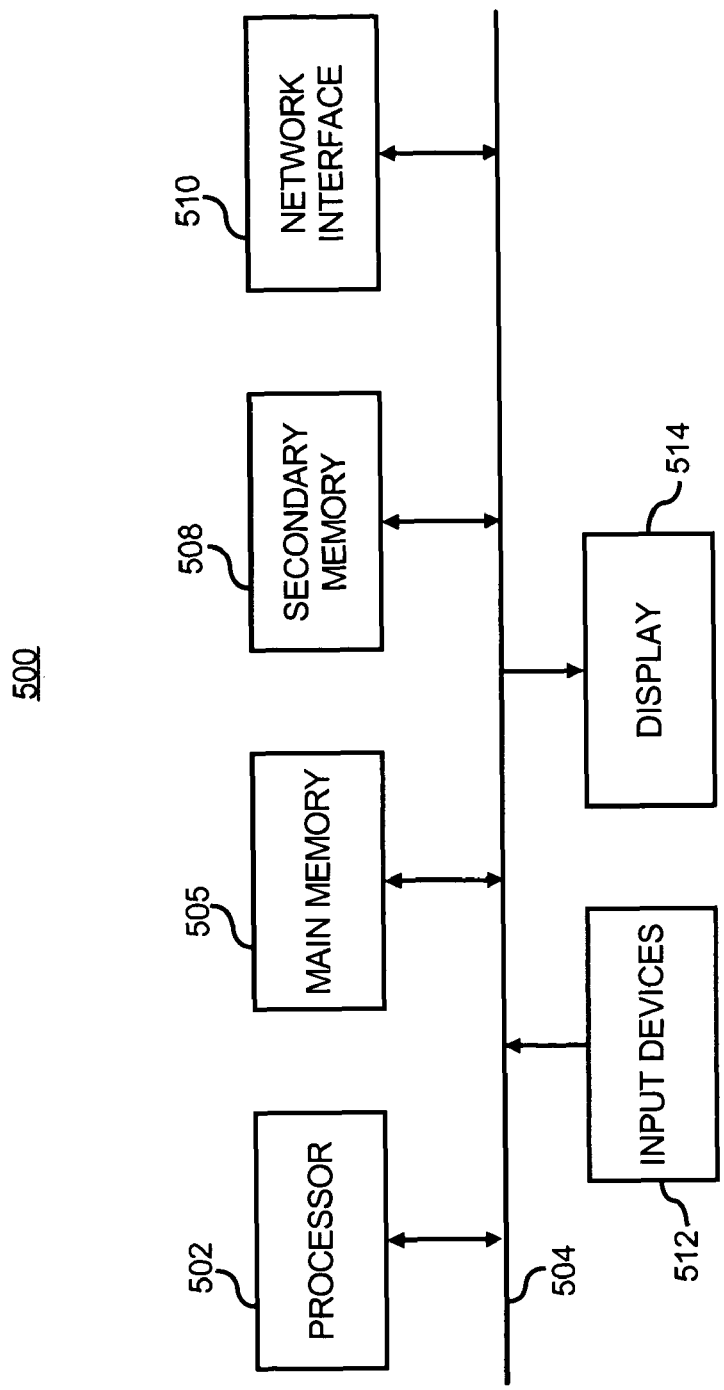
FIG. 5 is a block diagram of a computer system, according to an embodiment.

FIG. 5 illustrates a block diagram of a general purpose computer system 500 that may be used as a node in the overlay network 150. It will be apparent to one of ordinary skill in the art that a more sophisticated computer system may be used. Furthermore, components may be added or removed from the computer system 500 to provide the desired functionality.

The computer system 500 includes one or more processors, such as processor 502, providing an execution platform for executing software. Commands and data from the processor 502 are communicated over a communication bus 504. The computer system 500 also includes a main memory 506, such as a Random Access Memory (RAM), where software may be resident during runtime, and a secondary memory 508. The secondary memory 508 includes, for example, a hard disk drive and/or a removable storage drive representing a floppy diskette drive, a magnetic tape drive, a compact disk drive, etc., or a nonvolatile memory where a copy of the software may be stored. The secondary memory 508 may also include ROM (read only memory), EPROM (erasable, programmable ROM), EEPROM (electrically erasable; programmable ROM). The computer system 500 may include a display 514 and user interfaces comprising one or more input devices 512, such as a keyboard, a mouse, a stylus, and the like. The input devices 512 and the display 514 are optional. A network interface 510 is provided for communicating with other computer systems.

The main memory 506 and the secondary memory 508, either singly or in combination, may include the storage device 112 shown in FIG. 3 and may store peer lists and data in data clouds. Also, software performing the steps of the method 400, performing one or more peer list update processes and other software may be stored and/or hosted during execution in one or more of the memories 506 and 508.

One or more of the steps of the method 400 and other steps described herein may be implemented as software stored on a computer readable medium, such as the memory 506 and/or 508, and executed on the computer system 500, for example, by the processor 502.

The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A data-dependent overlay network comprising:
  a plurality of nodes;
  a plurality of data clouds, each data cloud including related data stored in the plurality of nodes in the data cloud, wherein the related data is related by topic, and wherein the related data includes different data;
  for each data cloud, a peer list maintained by each node in the data cloud, wherein each peer list includes at least one other node that is in the data cloud; and
  for each data cloud, a peer list update process used by each node in the data cloud for adding or removing nodes from peer lists for nodes in the data cloud, wherein the peer list update process includes identifying data of interest stored at another node in the data cloud and requesting the data of interest from the another node.

2. The overlay network of claim 1, wherein the peer list update process updates the peer lists depending on whether a node joins or leaves the data cloud.

3. The overlay network of claim 1, wherein the peer list update process adds all nodes in a data cloud to each peer list for the data cloud.

4. The overlay network of claim 1, wherein the peer list update process randomly determines which nodes in a data cloud are maintained on a peer list for each node in the data cloud.

5. The overlay network of claim 1, wherein the peer list update process maintains close nodes on a peer list for each node in the data cloud, whereby closeness is based on a network distance metric.

6. The overlay network of claim 1, wherein the peer list update process maintains different kinds of nodes in the data cloud on a peer list for each node in the data cloud, wherein the different kinds of nodes are based on attributes of nodes in the data cloud.

7. A node in a network, the node comprising:
a memory operable to store a peer list for at least one data cloud that the node is a member of, the peer list identifying other nodes storing data for the at least one data cloud, wherein the at least one data cloud is included in a plurality of data clouds stored in the network, each data cloud including related data stored in a plurality of nodes in the network and the related data is related by topic, and the related data includes different data; and
a processor operable to run a peer list update process for updating the peer list as nodes leave and join the at least one data cloud,
wherein the processor is operable to identify data of interest stored at another node in the at least one data cloud and request the data of interest from the another node.

8. The node of claim 7, wherein the memory is further operable to store data for the at least one data cloud.

9. The node of claim 7, wherein the identified data of interest stored at another node is identified from the peer list.

10. The node of claim 7, wherein the related data in a data cloud comprises data for use with a particular software application.

11. The node of claim 7, wherein the at least one data cloud comprises a plurality of data clouds that the node is a member of, and the memory is operable to store a peer list for each data cloud.

12. The node of claim 7, wherein each node that is a member of the at least one data cloud is operable to store a different peer list for the at least one data cloud.

13. A method comprising:
identifying a data cloud including data of interest, wherein the data cloud is in a data-dependent overlay network and comprises a subset of related data in a data space, wherein the related data is related by topic, and wherein the related data includes different data;
requesting a node in the data cloud to send a peer list maintained by the node for the data cloud;
receiving the peer list;
storing the peer list; and
updating the peer list using a peer list update process for the data cloud.

14. The method of claim 13, further comprising:
searching for data stored in the data cloud using the peer list.

15. The method of claim 14, wherein searching for data further comprises:
determining whether the data being searched for is identified on the peer list;
and in response to the data being identified on the peer list, requesting a node from the peer list storing the data to send the data.

16. The method of claim 15, further comprising:
in response to the data not being identified on the peer list, sending a query for the data to a node on the peer list.

17. The method of claim 13, wherein updating the peer list using a peer list update process for the data cloud further comprises:
updating the peer list in response to a node leaving or joining the data cloud.

18. The method of claim 13, wherein updating the peer list using a peer list update process for the data cloud further comprises:
adding all nodes in a data cloud to the peer list.

19. The method of claim 13, wherein updating the peer list using a peer list update process for the data cloud further comprises:
randomly determining which nodes in a data cloud are maintained on the peer list.

20. The method of claim 13, wherein updating the peer list using a peer list update process for the data cloud further comprises:
maintaining close nodes on the peer list, whereby closeness is based on a network distance metric.

21. The method of claim 13, wherein updating the peer list using a peer list update process for the data cloud further comprises:
maintaining different kinds of nodes on the peer list, wherein the different kinds of nodes are based on attributes of nodes in the data cloud.

22. The method of claim 13, further comprising:
receiving information from other nodes in the data cloud; and
determining the data to store.

23. The method of claim 22, wherein determining the data to store further comprises:
storing all the data received from the other nodes.

24. The method of claim 22, wherein determining the data to store further comprises:
storing only the data of interest to a user.

25. The method of claim 24, wherein storing only the data of interest to a user further comprises:
storing the data of interest only for a period of time the data is needed.

26. A node in an overlay network comprising:
means for storing a peer list for the at least one data cloud, the peer list including other nodes in the at least one data cloud;
means for running a peer list update process for updating the peer list as nodes leave and join the at least one data cloud, wherein the peer list update process includes identifying data of interest stored at another node in the at least one data cloud and requesting the data of interest from the another node; and
means for storing data in the at least one data cloud,
wherein the overlay network includes a plurality of data clouds, each data cloud including related data stored in a plurality of nodes in the data cloud,
wherein the related data is related by topic,
wherein the related data includes different data, and
wherein the node is in at least one data cloud of the plurality of data clouds.

27. The node of claim 26, wherein the at least one data cloud comprises multiple data clouds and the stored data comprises a peer list for each of the multiple data clouds.

28. A computer readable storage device upon which is stored a computer program including instructions which when executed by a processor cause the processor to perform the following comprising:

identifying a data cloud including data of interest, wherein the data cloud is a data cloud from a plurality of data clouds and each data cloud includes related data stored in a plurality of nodes in the data cloud, wherein the related data is related by topic, and wherein the related data includes different data;

receiving a peer list from a node in the data cloud;

storing the peer list; and updating the peer list using a peer list update process for the data cloud.

\* \* \* \* \*